United States Patent
Raffaelli

(10) Patent No.: US 11,708,125 B2
(45) Date of Patent: Jul. 25, 2023

(54) SHOCK ABSORBER WITH BIDIRECTIONAL SELECTIVE BLOCK, WHEEL GROUP AND MOTORCYCLE THEREOF

(71) Applicant: PIAGGIO & C. S.p.A., Pisa (IT)

(72) Inventor: Andrea Raffaelli, Pisa (IT)

(73) Assignee: PIAGGIO & C. S.P.A, Pontedera (IT)

( * ) Notice: Subject to any disclaimer, the term of this patent is extended or adjusted under 35 U.S.C. 154(b) by 515 days.

(21) Appl. No.: 16/611,375

(22) PCT Filed: May 4, 2018

(86) PCT No.: PCT/IB2018/053116
§ 371 (c)(1),
(2) Date: Nov. 6, 2019

(87) PCT Pub. No.: WO2018/207066
PCT Pub. Date: Nov. 15, 2018

(65) Prior Publication Data
US 2020/0156732 A1    May 21, 2020

(30) Foreign Application Priority Data

May 8, 2017    (IT) .................. 102017000049536

(51) Int. Cl.
*F16F 9/44* (2006.01)
*F16F 9/06* (2006.01)
(Continued)

(52) U.S. Cl.
CPC ............... *B62K 25/04* (2013.01); *B62K 5/05* (2013.01); *B62K 5/08* (2013.01); *B62K 5/10* (2013.01);
(Continued)

(58) Field of Classification Search
CPC ... B62K 5/05; B62K 5/08; B62K 5/10; B62K 25/04; B62K 2005/001; F16F 9/19;
(Continued)

(56) References Cited

U.S. PATENT DOCUMENTS 8,573,606 B1 * 11/2013 Kim .................. B60G 17/08
                                                 280/124.157
2012/0319376 A1    12/2012 Yu
2016/0160955 A1    6/2016 Yu

FOREIGN PATENT DOCUMENTS

CN    105008155 A    10/2015
EP    1571016 A1    9/2005
(Continued)

OTHER PUBLICATIONS

Chinese Office Action for corresponding application 2018800308269 filed May 4, 2018; dated Oct. 27, 2020.
(Continued)

*Primary Examiner* — Minnah L Seoh
*Assistant Examiner* — Felicia L. Brittman
(74) *Attorney, Agent, or Firm* — Cantor Colburn LLP

(57) ABSTRACT

Shock absorber having a main sheath and a main piston sliding inside the main sheath in a sliding direction (X-X), the main piston including a main rod coming out of the main sheath and a main head contained inside the main sheath, the main sheath being filled with hydraulic fluid, a secondary sheath fluidically connected to the main sheath and provided with at least one damping valve, where the secondary sheath is connected to the main sheath by a first and a second passage placed at opposite ends to the main head of the main piston, along the sliding direction (X-X), the secondary sheath including a control valve movable, according to a regulation stroke, between an unlocking position, in which it does not interfere with the first and second passages, and
(Continued)

a blocking position, where it occludes the first and second passages so as to realize a selective two-way block.

20 Claims, 4 Drawing Sheets

(51) Int. Cl.
    *B62K 25/04*     (2006.01)
    *B62K 5/05*     (2013.01)
    *B62K 5/08*     (2006.01)
    *B62K 5/10*     (2013.01)

(52) U.S. Cl.
    CPC .............. *F16F 9/062* (2013.01); *F16F 9/065* (2013.01); *F16F 9/44* (2013.01); *B62K 2025/047* (2013.01); *F16F 2222/12* (2013.01); *F16F 2228/066* (2013.01)

(58) Field of Classification Search
    CPC .... F16F 9/062; F16F 9/065; F16F 9/44; F16F 9/185; F16F 9/468; F16F 2228/066; F16F 2025/047

USPC ......................................................... 280/267
See application file for complete search history.

(56) References Cited

FOREIGN PATENT DOCUMENTS

| | | |
|---|---|---|
| JP | 1131343 A | 5/1989 |
| JP | 2001223809 A | 8/2001 |
| JP | 2009264515 A | 11/2009 |
| JP | 2014522342 A | 9/2014 |
| TW | 200923228 A | 6/2009 |
| TW | 201619523 A | 6/2016 |
| WO | 2014125404 A1 | 8/2014 |
| WO | 2016001722 A1 | 1/2016 |

OTHER PUBLICATIONS

International Search Report for corresponding application PCT/IB2018/053116 filed May 4, 2018; dated Jun. 22, 2018.
Chinese Office Action for corresponding application 2018800308269; Report dated Nov. 3, 2020.

* cited by examiner

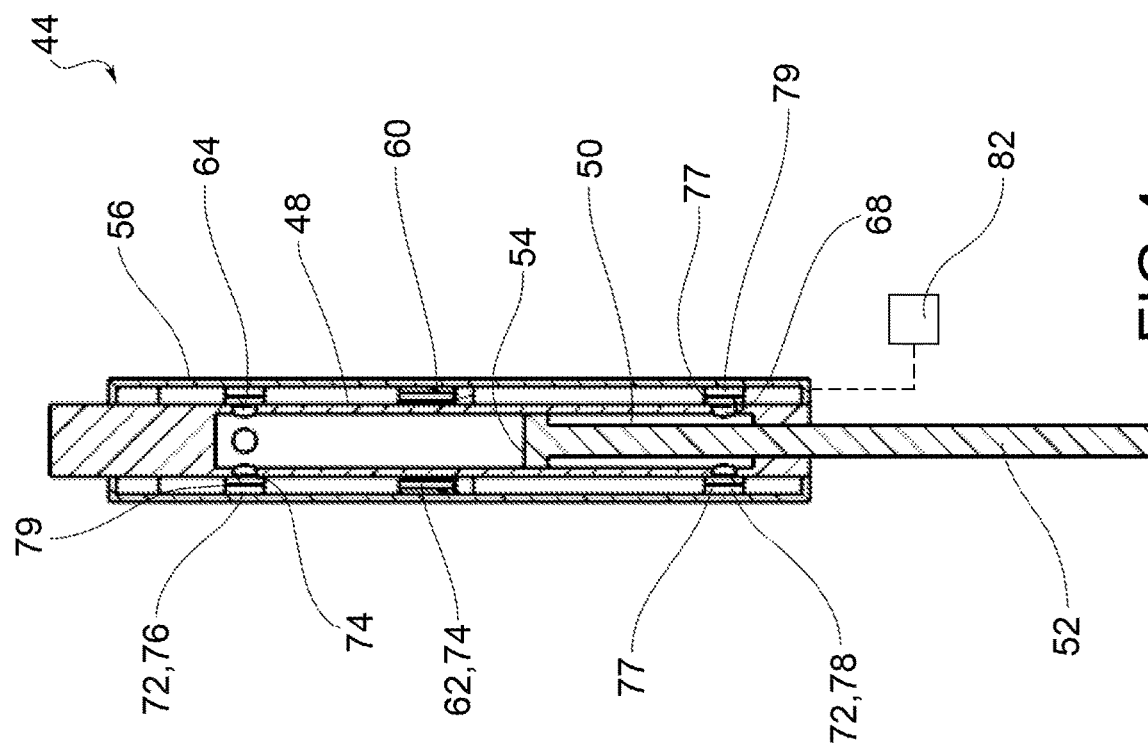
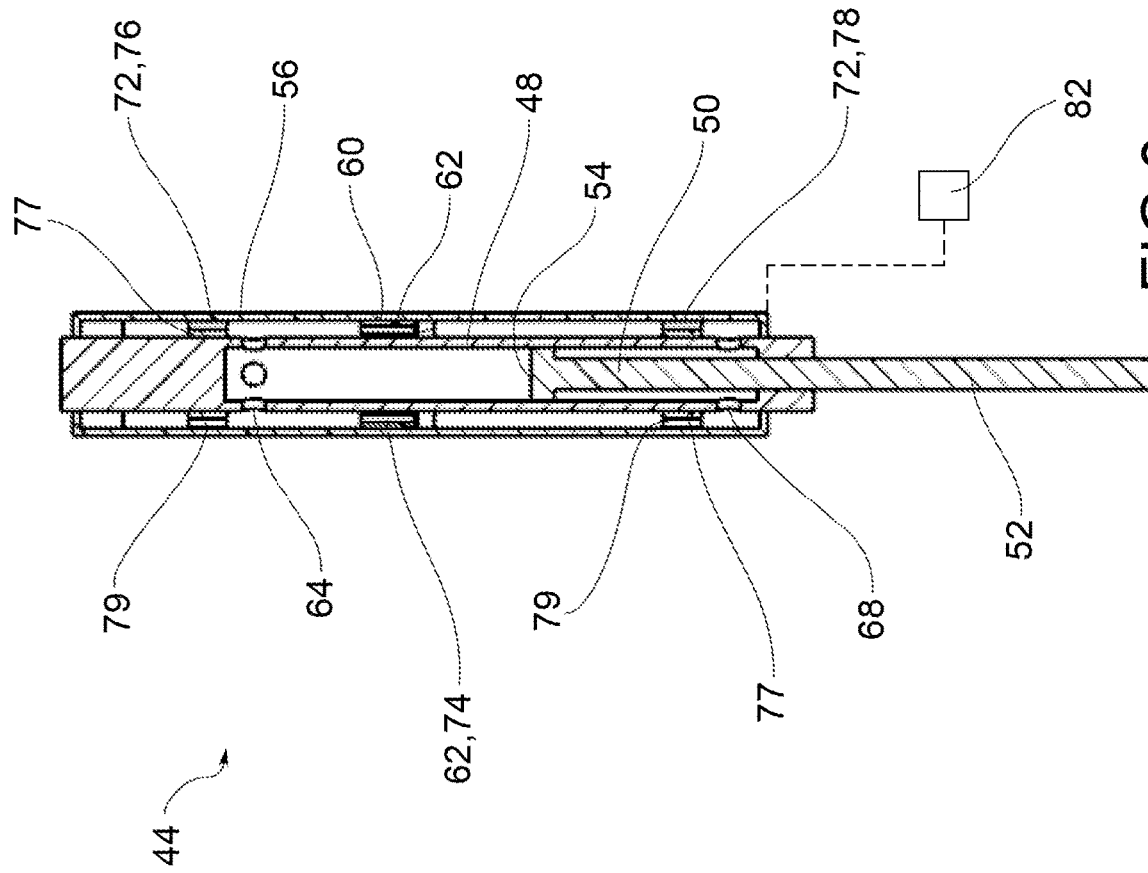

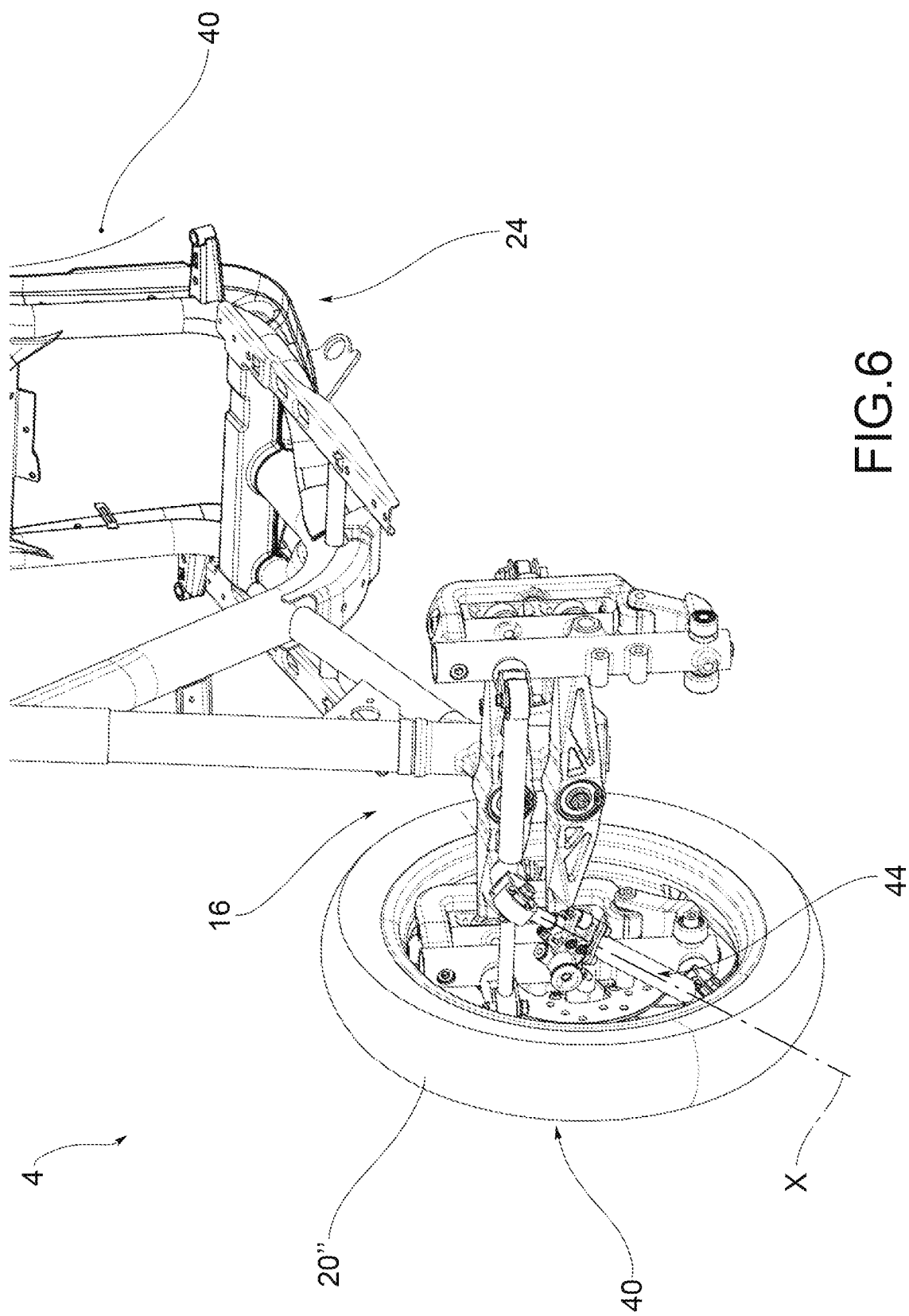

SHOCK ABSORBER WITH BIDIRECTIONAL SELECTIVE BLOCK, WHEEL GROUP AND MOTORCYCLE THEREOF

FIELD OF APPLICATION

The present invention relates to a shock absorber with bidirectional selective block, a wheel group comprising said damper with bidirectional selective block and a related motor vehicle.

BACKGROUND ART

As is known, the suspensions are connecting elements of the vehicle frame to the wheels: said connecting elements comprise at least one elastic element, typically a spring which allows oscillations of the suspended mass (frame) with respect to the unsprung mass (wheel group), and at least one shock absorber or a damper for said oscillations of the suspended mass.

Various solutions are known in the art which provide for the adjustment of the damping level of the shock absorbers according to the driving conditions of the vehicle. These solutions are intended to modify the dynamics of the suspensions in order to favour comfort or performance according to the user's needs. In most cases, the adjustments are not automatic but take place manually, by acting on special adjustments (typically screw type).

Automated solutions are also known in which the user requires, for example by means of a dashboard or handlebar button, a certain adjustment and the system by means of appropriate actuators makes the adjustment by acting automatically on said adjustments.

There are also some refined solutions that provide the use of magnetorheological fluids which, if subjected to magnetic and/or electromagnetic fields, modify their rheological characteristics and therefore the behaviour of the shock absorbers containing them.

Such solutions can significantly modify the shock absorber response, increasing it, almost to the total block, the damping in only one direction.

DISCLOSURE OF THE INVENTION

However, such prior art solutions have some drawbacks.

In fact, on the one hand they are rather complex and expensive to be implemented.

On the other hand, the known solutions are able to block the damping and therefore the suspension in a single direction, typically in the compression direction, while they are not able to implement a bidirectional selective block.

This selective block can be useful, for example, in conditions of stop or advancement at extremely low speed of the motorcycle, in order to block the motorcycle in a predetermined trim condition, in terms of rolling and/or pitching.

It is clear that the rolling block may be carried out in applications on labile multitrack vehicles, that is, provided with at least three wheels (two of which are coupled to the forecarriage or to the rear axle) or on a four-wheeled vehicle.

The need to solve the drawbacks and limitations mentioned with reference to the prior art is therefore felt.

This need is met by a shock absorber according to claim 1, by a wheel group according to claim 18 and by a motor vehicle according to claim 19.

DESCRIPTION OF THE DRAWINGS

Further features and advantages of the present invention will appear more clearly from the following description of preferred non-limiting embodiments thereof, in which:

FIG. 3 shows a schematic sectional view of a shock absorber, in an unlocked configuration, according to a further embodiment of the present invention;

FIG. 4 shows a schematic sectional view of the shock absorber in FIG. 3, in a blocked configuration;

FIG. 6 shows a perspective view of a further motorcycle comprising a shock absorber according to the present invention.

Elements or parts of elements in common to the embodiments described below are referred to with the same reference numerals.

DETAILED DESCRIPTION

Figure 1:
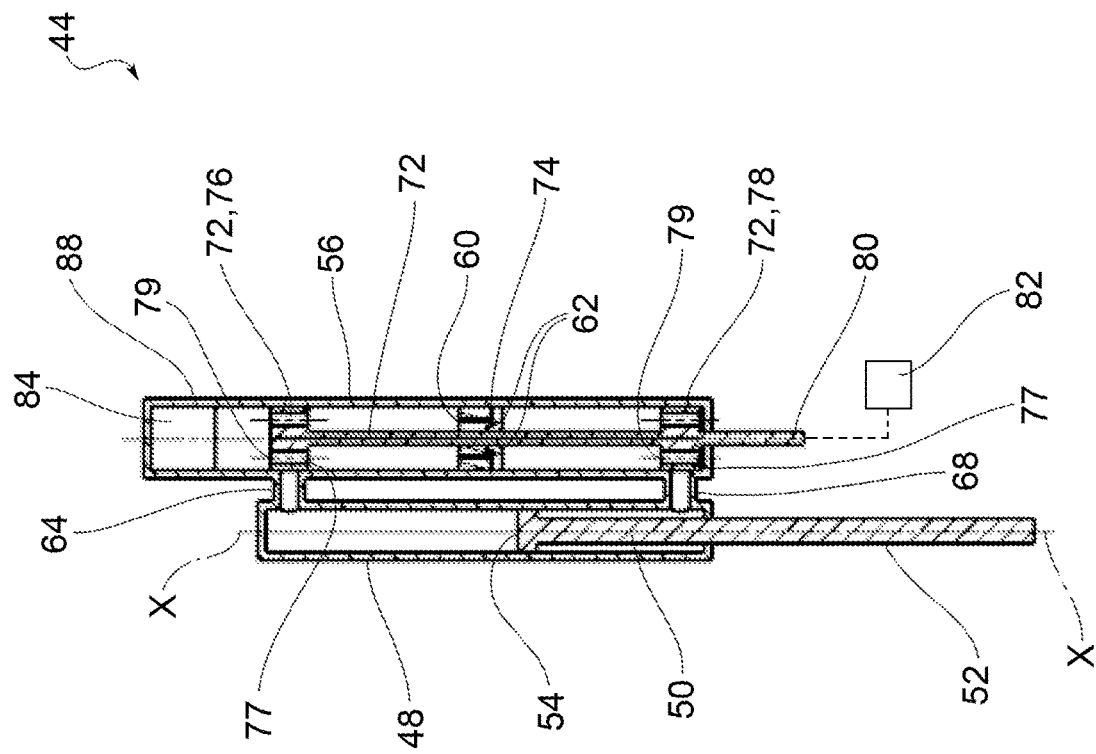
FIG. 1 shows a schematic sectional view of a shock absorber, in an unlocked configuration, according to an embodiment of the present invention.

With reference to the aforementioned figures, reference numeral 4 globally indicates a schematic overall view of a motor vehicle which incorporates at least one shock absorber 8 according to the present invention.

For the purposes of the present invention, it should be noted that the term motor vehicle must be considered in a broad sense; preferably, but not exclusively, the present invention is applied to a motorcycle.

The concept of a motorcycle must also be considered in a broad sense, comprising any motor cycle having a frame 12 comprising a forecarriage 16 which supports at least one front steering wheel 20 and a rear axle 24 which supports at least one rear wheel 28.

Therefore, this definition also includes tilting three-wheel motorcycles, such as two front wheels 20', 20" paired and steering wheels on the forecarriage 16 and a rear driving wheel 28 on the rear axle 24, but also motorcycles that include only one front wheel 20, steering, on the forecarriage 16 and two rear driving wheels 28 on the rear axle. Finally, the definition of motorcycle also includes the so-called quads, having two front wheels 20', 20" at the forecarriage 16 and two rear wheels 28 at the rear axle 24.

The frame 12, the forecarriage 16 and the rear axle 24 can have any shape, dimension and can be, for example, of the truss-like type, of the box-type, die-cast type and so on.

The frame 12 can be in one piece or in several parts.

The rear axle 24 typically includes a swingarm 32 which supports the driver's and/or passenger's saddle. The swingarm 32 is for example hinged to the frame 12 by a pivoting pin 36. It should be noted that the connection between swingarm 32 and frame 12 may be direct, through direct hinging, or it may also be by the interposition of crank mechanisms and/or intermediate frames.

The wheels, whether front or rear, are mechanically connected to the forecarriage and to the rear axle by means of respective wheel groups 40.

The wheel group 40 comprises the front or rear wheel 20, 28, an elastic element (typically a spring, not shown) suitable to allow an excursion to the wheel 20, 28, and a shock absorber 44, suitable to dampen the oscillations/excursions of the wheel 20, 28.

The shock absorber 44 comprises a main sheath 48 and a main piston 50 slidable within the main sheath 48 along a sliding direction X-X.

The main sheath 48 is hollow, in a known manner, and is filled with hydraulic fluid.

The main piston 50 comprises a main rod 52 protruding from the main sheath 48 and a main head 54 contained within the main sheath 48.

The main rod 52 and the main sheath 48 are mechanically connected respectively to a wheel, either front 20 or rear 28, and to a frame 12 portion (either front 16 or rear 24) or vice versa.

In other words, both the main shaft 52 and the main sheath 48 can be alternatively connected either to a wheel (front 20 or rear 28) or to a frame portion (forecarriage 16 or rear axle 24).

The shock absorber 44 further comprises a secondary sheath 56 fluidically connected to the main sheath 48 and provided with at least one damping valve 60 comprising holes 62 suitable to allow a calibrated passage of the hydraulic fluid of the main sheath 48.

According to a possible embodiment, said damping valve 60 comprises a damping plate, fixed to the secondary sheath 56 and at least partially perforated for the passage of hydraulic fluid.

Advantageously, the secondary sheath 56 is connected to the main sheath 48 by a first and a second passage 64,68 placed at opposite ends to the main head 54 of the main piston 50, along the sliding direction X-X.

In particular, the first passage 64 allows the flow of fluid when the main head 54 approaches the first passage 64 in a compression motion; the second passage 68 allows the flow of fluid when the main head 54 approaches the second passage 68 in an extension motion.

The secondary sheath 56 comprises a control valve 72 movable, according to a regulation stroke, between a working position, in which it does not interfere with said first and second passages 64, 68, and a blocking position, in which it occludes said first and second passages 64, 68 so as to realize a selective two-way block in said compression and extension motions.

The occlusion of the first and second passages 64, 68 effectively creates a bidirectional block of the main piston 50 which cannot move inside the main sheath 48 since the latter is filled with incompressible fluid.

According to an embodiment, the control valve 72 is an axial valve which slides according to the regulation stroke and is integral with the damping valve 60 fitted with a damping plate 74 at least partially perforated for the passage of hydraulic fluid.

For example, the control valve 72 comprises a pair of occluders 76, 78, arranged on opposite sides to the damping plate 74 so as to occlude each selectively the first and second passage 64, 68 respectively.

According to a possible embodiment, said occluders 76, 78 are discs, provided with a lateral edge 77 suitable to occlude the first and second passage 64, 68 when placed at these, and provided with through openings 79 for the passage of fluid inside the secondary sheath 56.

According to an embodiment, the control valve 72 is fitted with a secondary rod 80 operatively connected to actuator means 82 for its actuation along the adjustment stroke.

For example, the secondary rod 80 protrudes from the secondary sheath 56 to be mechanically connected to said actuator means 82.

The secondary sheath 56 is provided with at least one compensation volume 84, fluidically separate from the secondary fluid, delimited by a mobile septum 88 subjected to the pressure of the fluid coming from the main sheath 48.

Said compensation volume 84 is filled with a compressible fluid, typically a gas.

According to a possible embodiment, the mobile septum 88 is connected to elastic means contained inside the compensation volume 84.

The shock absorber 8 according to the present invention can have different architectures.

Figure 2:
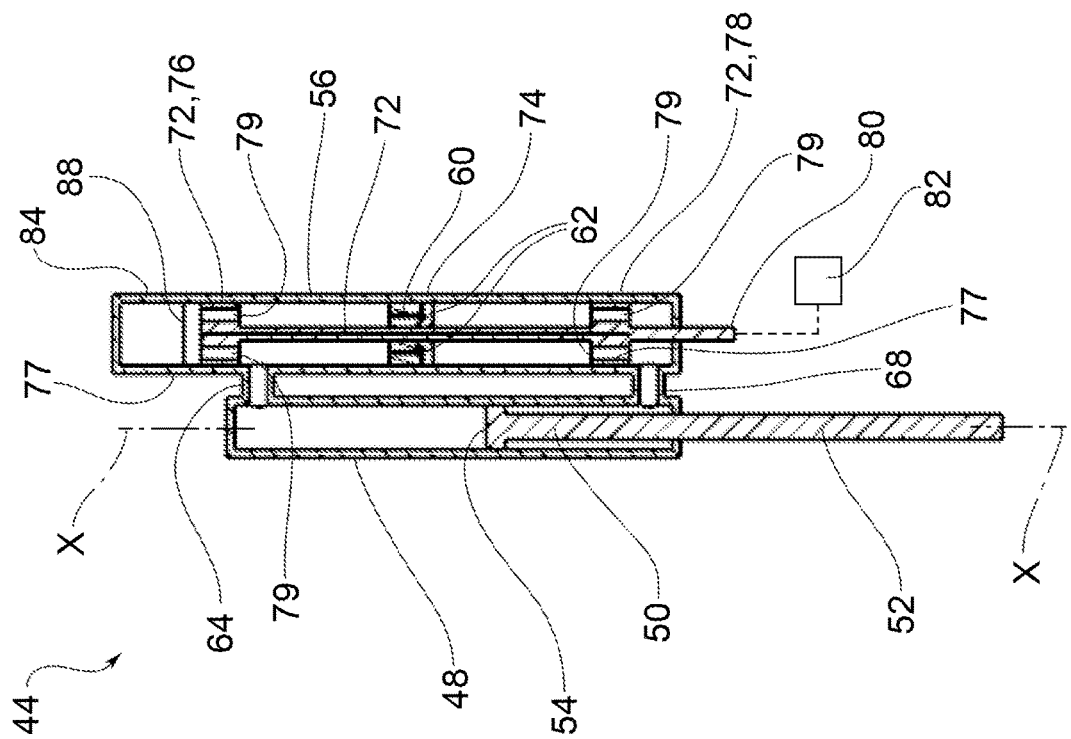
FIG. 2 shows a schematic sectional view of the shock absorber in FIG. 1, in a blocked configuration.
Figure 5:
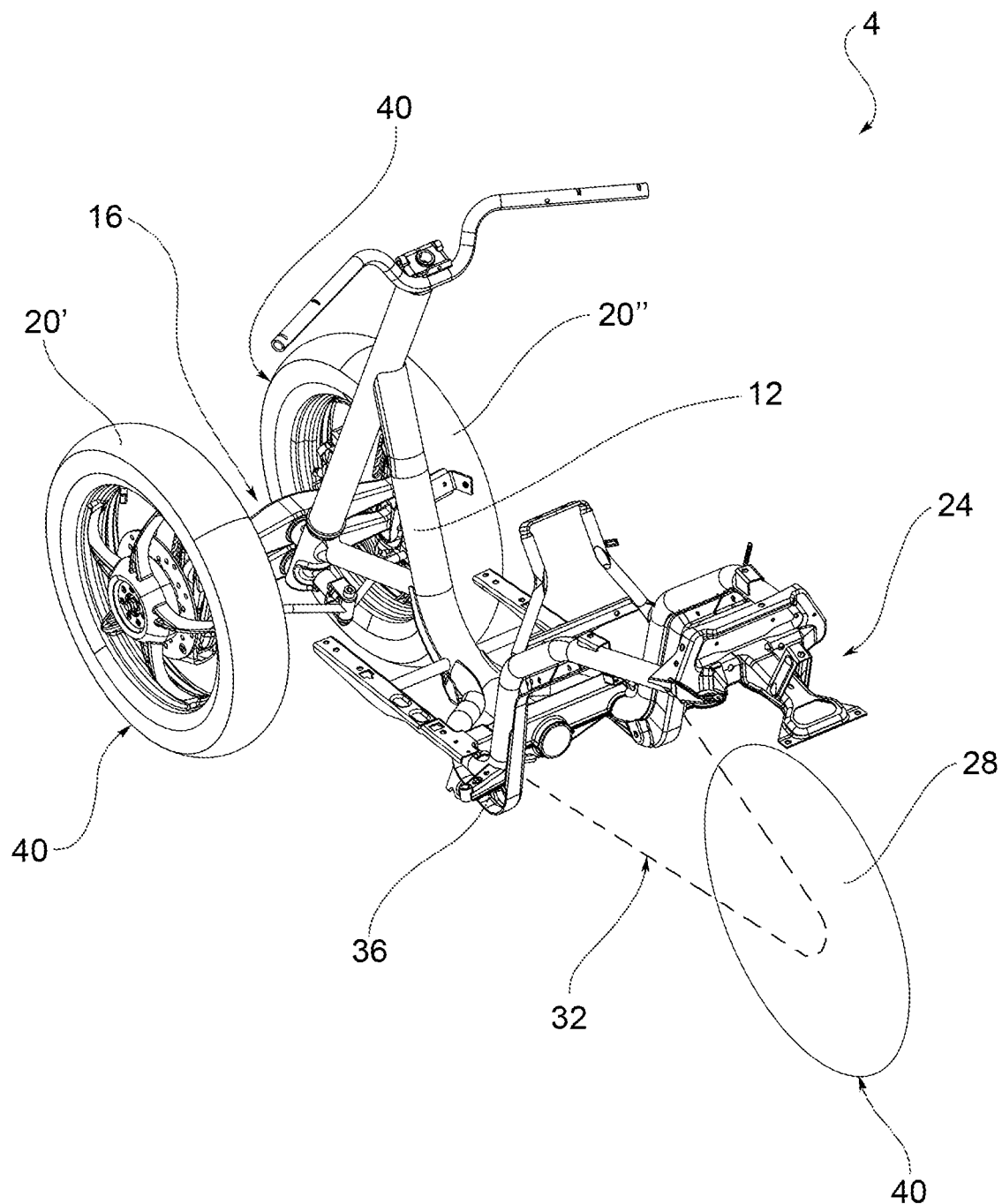
FIG. 5 shows a perspective front view of a motorcycle comprising a shock absorber according to the present invention.

According to a possible embodiment (FIGS. 1-2), the main and secondary sheaths 56 are parallel and side by side with respect to the sliding direction X-X.

According to a further possible embodiment (FIGS. 3-4), said main and secondary sheaths 56 are parallel and coaxial with respect to the sliding direction X-X.

In particular, the secondary sheath 56 is fitted on the outside of the main sheath 48.

The control valve 72 and the damping valve 60 are fitted around the main sheath 48. In particular, the control 72 and damping valves 60 are mutually exclusive; the secondary sheath 56 has no secondary rod 80 and is sliding in block on the main sheath 48.

For example, the secondary sheath 56 can be operatively connected to said actuator means 82 in order to slide relative to the main sheath 48.

The operation of a shock absorber for motor vehicles according to the present invention shall now be described.

In particular, in the unlocking configuration (FIGS. 1, 3), the first and second passages 64, 68 are free or perpendicular, since the occluders 76,78 of the control valve 72 do not occlude said first and second passages 64,68.

In this way, the fluid is free to flow between the main sheath 48 and the secondary sheath 56, pushed by the main piston 50 both in its compression motion and in its extension motion.

The compensation volume 84 decreases or expands as a function of the greater or lesser penetration of the main rod 52 within the main sheath 48, in a known manner.

The fluid passing through the damping valve 60 is damped by the passage through the corresponding holes 62.

Moreover, in a blocking configuration (FIGS. 2, 4), the occluders 76, 78 occlude the first and second passages 64, 68; in this way, the incompressible fluid is blocked inside the main sheath 48 and with it the main piston 50 contained therein.

Therefore, the shock absorber and the related wheel 20,28 is not free to oscillate but is constrained in the position in which it is at the moment of the occlusion of the first and second passages 64, 68.

The blocking configuration is obtained by translating the control valve 72 by the relative regulation stroke, by means of the actuator means 82 which act, for example, on the secondary rod 80, if provided. Alternatively (FIGS. 3-4), it is possible to translate the secondary sheath 56 with respect to the main sheath 48, by means of said actuator means 82.

Obviously, the subsequent unlocking of the shock absorber occurs simply by moving the control valve 72 so as to return the first and second passages 64, 68 to the patency condition.

The uses of the shock absorber block can be multiple.

For example, if the shock absorber can perform the function of controlling/blocking the stroke of the relative wheel; furthermore, by blocking the wheel stroke, it can perform the function of locking the pitch and/or rolling movements of a motor vehicle.

Obviously, the rolling block can be implemented, by the present invention, in motor vehicles comprising at least three wheels (two of which are coupled to the forecarriage or rear axle) and in motor vehicles with four wheels.

Furthermore, this block of the wheel stroke can also be used as a motor vehicle anti-theft function.

As can be appreciated from the description, the present invention allows overcoming the drawbacks of the prior art.

In particular, the shock absorber with bidirectional selective blocking allows, in contrast to known solutions, to completely block the suspension in both directions of compression and extension.

This bidirectional block occurs in a simple, reliable and economic way.

Therefore, the invention allows fixing a specific trim of the motorcycle, in terms of rolling and/or pitching, in stop or limited speed conditions, lower than a given threshold value.

The solution is simple and inexpensive, and can also be applied to pre-existing suspension solutions, such as an add-on or retrofit device.

A man skilled in the art, in order to meet contingent and specific requirements, may make several modifications and variants to the shock absorbers and suspensions described above, all of which fall within the scope of the invention as defined by the following claims.

The invention claimed is:

1. A shock absorber comprising:
a main sheath and a main piston sliding inside the main sheath in a sliding direction, the main piston comprising a main rod coming out of the main sheath and a main head contained inside the main sheath, the main sheath being filled with hydraulic fluid,
the main rod and the main sheath being suitable to be mechanically connected respectively to a wheel and to a frame or vice versa,
a secondary sheath fluidically connected to the main sheath and provided with at least one damping valve comprising holes suitable to allow a calibrated passage of the hydraulic fluid of the main sheath,
wherein the secondary sheath is connected to the main sheath by a first and a second passage placed at opposite ends to the main head of the main piston, in a sliding direction, the first passage allowing the flow of fluid when the main head approaches the first passage in a compression motion and the second passage allowing the flow of fluid when the main head approaches the second passage in an extension motion,
wherein the secondary sheath comprises a control valve movable, according to a regulation stroke, between an unlocking position, in which it does not interfere with said first and second passages, and a blocking position, wherein it occludes said first and second passages, and
wherein, when the control valve is in the blocking position, the main piston is locked in position within the main sheath and is unable to move in the sliding direction.

2. The shock absorber according to claim 1, wherein said damping valves comprises a damping plate, fixed to the secondary sheath and at least partially perforated for the passage of hydraulic fluid.

3. The shock absorber according to claim 1, wherein said control valve is an axial valve which slides according to the regulation stroke and is integral with the damping valves fitted with a damping plate at least partially perforated for the passage of hydraulic fluid.

4. The shock absorber according to claim 1, wherein said control valve comprises a pair of occluders, arranged on opposite sides to a damping plate so as to occlude each selectively the first and second passage respectively.

5. The shock absorber according to claim 4, wherein said occluders are discs, provided with a lateral edge suitable to occlude the first and second passage when placed at these, and provided with through openings for the passage of fluid inside the secondary sheath.

6. The shock absorber according to claim 1, wherein the control valve is fitted with a secondary rod operatively connected to actuator means for its actuation along the adjustment stroke.

7. The shock absorber according to claim 6, where the secondary rod comes out of the secondary sheath.

8. The shock absorber according to claim 1, wherein the secondary sheath is provided with at least one compensation volume, fluidically separate from the secondary fluid, delimited by a mobile septum subjected to the pressure of the fluid coming from the main sheath.

9. The shock absorber according to claim 8, wherein said compensation volume is filled with a compressible fluid.

10. The shock absorber according to claim 8, wherein the mobile septum is connected to elastic means contained inside the compensation volume.

11. The shock absorber according to claim 1, wherein said main and secondary sheaths are parallel and juxtaposed with each other, in relation to the sliding direction.

12. The shock absorber according to claim 1, wherein said main and secondary sheaths are parallel and coaxial with each other, in relation to the sliding direction.

13. The shock absorber according to claim 12, wherein the secondary sheath is fitted on the outside of the main sheath.

14. The shock absorber according to claim 12, wherein the control valve and the damping valves are fitted around the main sheath.

15. The shock absorber according to claim 12, where said control and damping valves are in one piece.

16. The shock absorber according to claim 12, wherein the secondary sheath has no stem and is slidable in blocking on the main sheath.

17. The shock absorber according to claim 12, wherein the secondary sheath is operatively connected to actuator means in order to slide relative to the main sheath.

18. A wheel assembly comprising a shock absorber according to claim 1, wherein a main stem and the main sheath are mechanically connected to a wheel and to a frame of the motor vehicle or vice versa.

19. A motor vehicle comprising a forecarriage which supports two front steering wheels and a rear axle that supports at least one rear wheel, wherein at least one of said front wheels is mechanically connected to the forecarriage by means of a shock absorber according to claim 1.

20. The motor vehicle according to claim 19, where the motor vehicle is a tilting motorcycle with two front steering wheels at the forecarriage and at least one rear wheel at the rear axle, in which each of said front steering wheels is connected to the forecarriage by means of the shock absorber.

* * * * *